US011854107B1

(12) United States Patent
DeBeaune et al.

(10) Patent No.: US 11,854,107 B1
(45) Date of Patent: *Dec. 26, 2023

(54) SYSTEMS AND METHODS FOR PROVIDING NOTIFICATIONS REGARDING DATA BREACHES

(71) Applicant: Wells Fargo Bank, N.A., San Francisco, CA (US)

(72) Inventors: Daina DeBeaune, San Francisco, CA (US); Chirstiane Evans, San Francisco, CA (US); Bryan Kroll, San Mateo, CA (US); Jill Bagalso McNulty, San Francisco, CA (US); Gary Schilling, San Francisco, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,212

(22) Filed: Nov. 28, 2022

Related U.S. Application Data

(63) Continuation of application No. 16/181,068, filed on Nov. 5, 2018, now Pat. No. 11,514,540.

(51) Int. Cl.
*G06Q 50/26* (2012.01)
*G06Q 20/10* (2012.01)
*G06F 21/57* (2013.01)

(52) U.S. Cl.
CPC ......... *G06Q 50/265* (2013.01); *G06Q 20/108* (2013.01); *G06F 21/57* (2013.01)

(58) Field of Classification Search
CPC ............... G06Q 50/265; G06Q 20/108; G06Q 20/4014; G06Q 20/4016; G06F 21/57; G06F 21/554
See application file for complete search history.

(56) References Cited

U.S. PATENT DOCUMENTS 9,392,008 B1 * 7/2016 Michel ................ H04L 63/1425
2002/0178122 A1 * 11/2002 Maes ................... G06Q 20/401
705/64

(Continued)

FOREIGN PATENT DOCUMENTS

WO    WO-2018229631 A1 * 12/2018 ........... F16H 19/043

OTHER PUBLICATIONS

Unknown ("Administrator"). Target Customers are Targeted Massive Data Breach, idtheft.org, Dec. 20, 2013, Feb. 16, 2021, Mar. 27, 2023 <https:// idtheftinfo.org/latest-news/52> (Year: 2013).*

(Continued)

*Primary Examiner* — Andrew B Whitaker
*Assistant Examiner* — Shaun D Sensenig
(74) *Attorney, Agent, or Firm* — Foley & Lardner LLP

(57) ABSTRACT

A computer-implemented method includes acquiring information regarding the user and generating one or more indicators of a data breach for an entity that stores one of data regarding the user or an indication of a transaction with the user in a past predefined time period. The computer-implemented method further includes determining that the one or more indicators meet a threshold level for notifying the user of the data breach; in response to determining that the one or more indicators meet the threshold, generating a notification specific to the user regarding the data breach; and providing the notification to the user during a log-in process associated with the provider computing system.

20 Claims, 10 Drawing Sheets

(56) References Cited

U.S. PATENT DOCUMENTS

| | | | |
|---|---|---|---|
| 2006/0090073 A1* | 4/2006 | Steinberg | H04L 63/168 |
| | | | 713/170 |
| 2015/0154520 A1* | 6/2015 | Federgreen | G06Q 30/018 |
| | | | 705/7.11 |
| 2015/0348042 A1 | 12/2015 | Jivraj et al. | |
| 2016/0269908 A1* | 9/2016 | Richards | G06Q 20/08 |
| 2016/0364727 A1* | 12/2016 | DeLawter | G06Q 20/389 |
| 2018/0039794 A1 | 2/2018 | Sher-Jan | |
| 2018/0276669 A1* | 9/2018 | McIntyre | G06Q 20/407 |
| 2018/0308099 A1* | 10/2018 | Binns | G06Q 20/4016 |
| 2018/0310171 A1* | 10/2018 | Whitaker | G06Q 10/00 |
| 2019/0098053 A1* | 3/2019 | Iaroshevych | G06F 21/554 |
| 2020/0193018 A1* | 6/2020 | Van Dyke | G06F 21/6245 |

OTHER PUBLICATIONS

Malcolm, Nick. Anomaly detection: safer Login with ThisData and Auth0, medium.com, Mar. 20, 2017, Jul. 1, 2021, <https://medium.com/@auth0/anomaly-detection-safer-login-with-thisdata-and-auth0-6d4b3583b 1 0b> (Year: 2017).

Unknown ("Administrator"). Target Customers are Targeted Massive Data Breach.idtheft.org, Dec. 20, 2013, <http://idtheftinfo.org/latest-news/52> (Year: 2013).

* cited by examiner

SYSTEMS AND METHODS FOR PROVIDING NOTIFICATIONS REGARDING DATA BREACHES

CROSS-REFERENCE TO RELATED PATENT APPLICATION

This application is a Continuation of U.S. patent application Ser. No. 16/181,068, filed Nov. 5, 2018, which is incorporated herein by reference in its entirety.

TECHNICAL FIELD

Embodiments of the present disclosure relate generally to the field of notifying potentially affected persons or entities of data security breaches.

BACKGROUND

Many transactions involve a customer providing the customer's payment information to a third party such as a merchant (e.g., by providing a payment card, by entering in payment information through an online checkout system, etc.). The third party then uses the payment information provided by the customer to process a payment for the transaction. The third party may also store the payment information, for example, in a database of transactions or a database storing payment information for various customers for use in future transactions. As such, third parties may be susceptible to data breaches in which customer information, including payment information, may be leaked. Customers may not be aware of data breaches that affect them or know what steps they should take to remedy them.

SUMMARY

One embodiment relates to a computer-implemented method. The method includes receiving, by a provider computing system, an indicator of enrollment of a user in a breach notification service; acquiring, by the provider computing system, information regarding the user; and generating, by the provider computing system, one or more indicators of a data breach for an entity that stores one of data regarding the user or an indication of a transaction with the user in a past predefined time period. The method further includes determining, by the provider computing system, that the one or more indicators meet a threshold level for notifying the user of the data breach; in response to determining that the one or more indicators meet the threshold, generating, by the provider computing system, a notification specific to the user regarding the data breach; and providing, by the provider computing system, the notification to the user during a log-in process for a product or service associated with the provider computing system.

Another embodiment relates to a breach notification system. The system includes a network interface structured to communicate data over a network, a processor, and a memory coupled to the processor. The memory includes non-transitory machine-readable storage media having instructions stored thereon. When executed by the processor, the instructions cause the breach notification system to receive, by the network interface, an indicator of enrollment from a user in a breach notification service, acquire information regarding the user, and generate one or more indicators of a data breach for an entity that stores one of data regarding the user or has transacted with the user in a past predefined time period. The instructions further cause the breach notification system to determine that the one or more indicators meet a threshold level for notifying the user of the data breach, in response to determining that the one or more indicators meet the threshold, generate a notification specific to the user regarding the data breach, and provide, by the network interface, the notification to the user during a log-in process for a product or service associated with the provider computing system.

Another embodiment relates to a computer-implemented method. A method includes receiving, by a provider computing system, an indicator of enrollment of a user in a breach notification service; acquiring, by the provider computing system, information regarding the user; and generating, by the provider computing system, one or more indicators of a data breach for an entity that stores one of data regarding the user or has transacted with the user in a past predefined time period. The method also includes determining, by the provider computing system, that the one or more indicators meet at least one of two or more thresholds for notifying the user of the data breach. The two or more thresholds include a first threshold and a second threshold that is higher than the first threshold and associated with a higher risk level than the first threshold. The method further includes, in response to determining that the one or more indicators meet at least one threshold, generating, by the provider computing system, a notification specific to the user regarding the data breach and based on the at least one threshold met by the one or more indicators. The notification includes instructions for taking one or more user-specific corrective actions to address the data breach. The notification also facilitates the one or more user-specific corrective actions from the notification. Accordingly, the method includes providing, by the provider computing system, the notification to the user during a log-in process for a product or service associated with the provider computing system.

DETAILED DESCRIPTION

Figure 1:
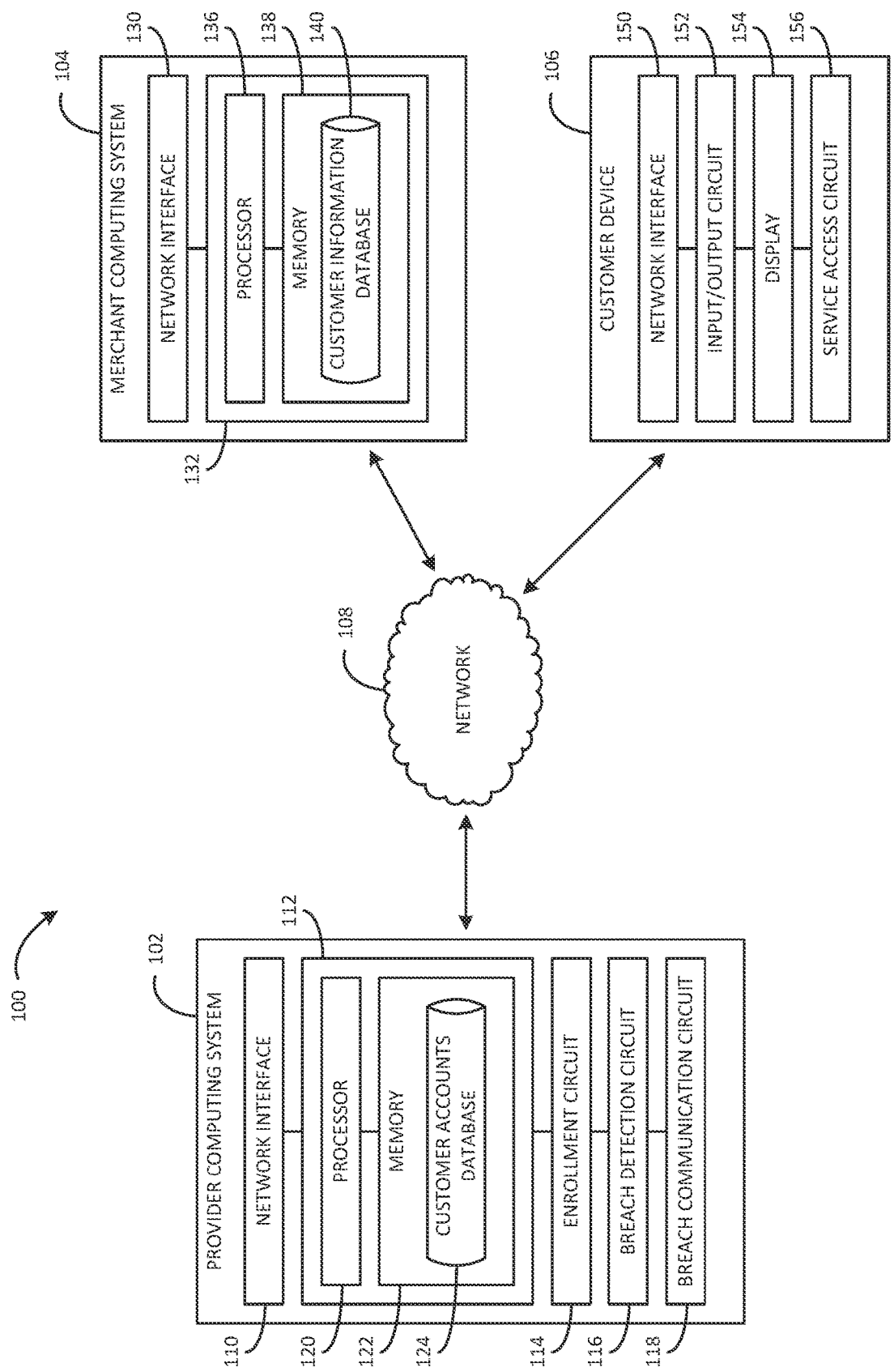
FIG. 1 is a breach notification computer system, according to an example embodiment.

Referring to the Figures generally, various systems, methods, and apparatuses for providing notifications regarding potential breaches are provided herein. An example embodiment is described as follows. A user enrolls in a breach notification service with a provider of one or more accounts held by the user (e.g., demand deposit account(s), credit card account(s), etc.). In response to the user's enrollment, the provider acquires information about the user and the user's financial activity, such as where the user banks, payment risk factors, how the user pays, and location data regarding the user. Subsequently, the provider receives or determines one or more indicators of an actual or potential data breach. The provider assesses the one or more indicators to determine whether the breach meets a threshold level regarding a worthiness to communicate regarding the breach to potentially affected users enrolled in the breach notification service. If the breach meets the threshold level, the provider provides a tailored communication to enrolled users regarding the data breach as part of a log-in process.

The systems and methods described herein offer technical advantages for notifying users regarding an actual or potential data breach. Currently, communications regarding fraud and data breaches cast a wide net and are provided by each affected entity. For example, a merchant provides a message to its users regarding its own breach. As such, users experiencing a data breach, or multiple data breaches, must be notified by each affected entity. Moreover, some affected entities may ineffectively provide data breach notifications to users (e.g., by notifying users that they may be the victim of a data breach when it is unlikely they have been affected). For example, some affected entities may send out notifications to all users who have transacted with the entity within a certain time period without evaluating, on a user-by-user basis, whether individual users are affect or are likely affected (e.g., a user who elected not to store payment information with the entity when carrying out the transaction may not be affected). By contrast, the present systems and methods are directed to facilitating an account provider in determining that an actual or potential breach has occurred and providing a notification to all or mostly all likely affected users. The account provider has the aggregated financial data from many users. Additionally, the account provider may couple to various merchants and other entities (e.g., via one or more application programming interfaces ("APIs")) that may be susceptible to data breaches. Thus, the account provider is in the unique position to detect data breaches for multiple entities and serve as a central location for providing data breach notifications to many users. This type of service would be extremely difficult to implement if not by the account provider.

Moreover, the breach notifications described herein are provided to users as part of a log-in process that users use, for example, to access online services offered by the provider. As many users need to log in frequently to access these online services (e.g., as part of paying bills, checking account balances, etc.), providing the potential breach notification to users as part of the log-in process helps ensure that the user will receive the notification, thereby increasing the efficacy of the communication. Providing the potential breach notification as part of a log-in process also simplifies how such notifications are provided to users, which decreases the number of actions that processors of provider computing systems must process. Further, in various embodiments, the potential breach notifications are only provided to users that have opted in to the breach notification service, thereby reducing processing power needed for the notification system and increasing the efficiency of the notification system by serving just the users that have opted in.

Referring now to FIG. 1, an environmental view of a breach notification system 100 is shown, according to an example embodiment. In brief overview, the system 100 includes a provider computing system 102, a merchant computing system 104, and a user device 106 coupled to a network 108. In reference to components of the system 100 described herein, references to the components in singular or plural form are not intended as disclaimers of alternative arrangements unless otherwise indicated. The components are configured to interact, in various arrangements, as described in further detail below.

In the system 100, data communication between the provider computing system 102, merchant computing system 104, and user device 106 is via the network 108. In some arrangements, the network 108 includes the Internet. In other arrangements or combinations, the network 108 includes a local area network or wide area network. In still other embodiments, the network 108 is a proprietary network, such as a proprietary banking network with cryptography capabilities for security. The network 108 may be facilitated by short and/or long-range communication techniques, including Bluetooth transceivers, Bluetooth beacons, RFID transceivers, NFC transceivers, Wi-Fi transceivers, cellular transceivers, wired network connections, etc.

The provider computing system 102 is associated with and operated by a provider of accounts (e.g., demand deposit accounts, credit card accounts, etc.) held by users of the provider computing system 102. In the context of the present disclosure, the provider can include financial institutions, such as commercial banks, credit unions, investment brokerages, mobile wallet providers, and so on. Additionally, in various arrangements, the provider computing system 102 may be configured to process payments made by users using the financial accounts.

As shown in FIG. 1, the provider computing system 102 includes a network interface 110, a processing circuit 112, an enrollment circuit 114, a breach detection circuit 116, and a breach communication circuit 118. The network interface 110 includes program logic that facilitates coupling of the provider computing system 102 to the network 108. Accordingly, the network interface 110 supports and enables communication between the provider computing system 102 and other components of the system 100, such as the merchant computing system 104 and the user device 106.

The processing circuit 112 includes at least one processor 120 and a memory 122. As shown in FIG. 1, the memory 122 includes a user accounts database 124, though it should be understood that the user accounts database 124 may alternatively be provided separately from the memory 122. The user accounts database 124 is configured to retrievably store information relating to accounts held by various users of the provider. In some embodiments, the user accounts database 124 includes personal information (e.g., names, addresses, phone numbers, e-mail addresses, etc.), authentication information (e.g., username/password combinations, device authentication tokens, security question answers, unique user identifiers, biometric data, etc.), and financial information (e.g., mobile wallet token information, account numbers, account balances, available credit, credit history, transaction histories, etc.) relating to the various users of the provider and their associated accounts.

The enrollment circuit 114 is configured to receive an indicator that a user is enrolling in a breach notification service offered by the provider computing system 102. For the purposes of the present disclosure, a "breach notification service" includes a service or product for providing a notification to a user regarding a data breach as described herein. For example, the enrollment circuit 114 may offer the user the opportunity to enroll in the breach notification service via an online banking portal, through a branch location of the provider, through an emailed link, etc. Additionally, in response to receiving an indicator of enrollment, the enrollment circuit 114 is configured to acquire information about the user. The acquired information may include, for example, where the user banks, user payment risk factors (e.g., routinely transacting with a merchant that has recently experienced a data breach), how the user pays (e.g., credit card, debit card, check, mobile wallet, etc.), and/or location data (e.g., using global positioning system ("GPS") permissions of a mobile device associated with the user, such as the user device 106).

In some arrangements, the enrollment circuit 114 acquires information about the user that is already stored by the provider computing system 102, for example, in the user accounts database 124. Moreover, the enrollment circuit 114 may infer, predict, or determine information about the user from information that is stored in the user accounts database 124, such as how the user typically pays. In other arrangements, the enrollment circuit 114 is configured to gather additional information about the user. As an example, the enrollment circuit 114 may request additional information from the user at the time the user enrolls in the breach notification service. As another example, the enrollment circuit 114 may gather additional information about the user from a centralized database (e.g., a credit reporting agency database).

The breach detection circuit 116 is configured to generate indicators of a data breach. For the purposes of the present disclosure, an "indicator" is a quantitative or qualitative measure, marker, or other type of indication evidencing that an entity has suffered or may have suffered a data breach and/or a customer's information has been compromised as a result of an entity's data breach. The entity may be, for example, an entity that stores data regarding the user and/or has transacted with the user (e.g., in a past predefined time period, such as the time period covered or suspected to be covered in the data breach). For example, in some arrangements, the breach detection circuit 116 is configured to receive information from a merchant or other entity (e.g., by using an API for the merchant computing system 104 to access information about the merchant) indicating that the merchant has detected a potential data breach and generate one or more indicators based on the received information. In other arrangements, the breach detection circuit 116 is configured to generate an indicator of a data breach by searching the Internet and screen scraping the results (e.g., searching for press releases by merchants indicating that a data breach has occurred). In yet other arrangements, the breach detection circuit 116 is configured to generate an indicator of a data breach by analyzing behaviors of users (e.g., based on user information acquired by the enrollment circuit 114). For example, the breach detection circuit 116 may determine, on a user-specific basis, whether the user may have experienced a data breach based on risky purchasing behaviors by the user, such as by making purchases from unverified merchants or making purchases from a merchant known to have experienced a data breach.

The breach communication circuit 118 is configured to use the one or more indicators of a data breach (e.g., generated based on observed behaviors, received via an API) to determine whether to provide a notification to a given user. Accordingly, in various arrangements, the breach communication circuit 118 is configured to assess the one or more indicators to determine whether the data breach meets a threshold level to determine/control when to communicate the breach to potential affected users.

In some embodiments, the breach communication circuit 118 is configured to determine whether a potential breach for a given entity has occurred using the one or more indicators and then identify the affected users. For example, the breach communication circuit 118 may assign a numerical rating (e.g., a rating out of ten, a percentage rating of risk, etc.) representative of the risk level to each of one or more indicators for a given entity. The breach communication circuit 118 may then sum the risk level(s) for the indicator(s) and compare the sum to a certain threshold, determining that a notification about the data breach should be sent to affected users if the sum meets the certain threshold. As another example, the breach communication circuit 118 may determine that a notification should be transmitted to affected users if a given entity has a certain threshold number of indicators associated with it. As a third example, the breach communication circuit 118 may determine that a notification should be transmitted to affected users if the breach communication circuit 118 receives an indicator confirming that a data breach has occurred, such as a press release from the affected entity indicating that a data breach has occurred or a communication from the affected entity indicating that a data breach has occurred.

Subsequently, in response to determining that a potential breach for a given entity has occurred using the one or more indicators, the breach communication circuit 118 is configured to identify users that may have been affected by the potential breach. Accordingly, as an illustration, if User A consistently shops at Merchant A while User B does not, and Merchant A is determined to have experience a data breach, User A will get the message but not User B. The breach communication circuit 118 may identify users based on the acquired information about the users enrolled in the breach notification service. As an example, the breach communication circuit 118 may provide a notification to users that have performed a transaction with the affected entity within a certain time period before and/or after the breach. As another example, the breach communication circuit 118 may provide a notification to users that have performed a certain number of transactions with the affected entity within a certain time period before and/or after the breach. As a third example, the breach communication circuit 118 may provide a notification to users that have performed a certain type of transaction with the affected entity within a certain time period before and/or after the breach, such as providing a notification to users that performed a credit card transaction with the affected entity but not to users that performed a mobile wallet transaction with the affected entity. As a fourth example, the breach communication circuit 118 may determine which users are within a certain distance of a compromised entity (e.g., using GPS data from user devices, such as the user device 106) and determine which users should be provided with a notification at least partially based on the distance from the compromised entity. To illustrate, the breach communication circuit 118 may provide notifications to users within a certain distance of a compromised automatic teller machine ("ATM").

In some arrangements, the breach communication circuit 118 may use multiple thresholds to determine a level of risk for a given user. For example, the breach communication circuit 118 may use a first threshold number of transactions with the affected entity to determine that the user has a first, lower level of risk of breach and a second, higher threshold number of transactions with the affected entity to determine that the user has second, higher level of risk of breach. However, it should be understood that the breach communication circuit 118 may use more or less than two thresholds.

In other embodiments, the breach communication circuit 118 is configured to determine whether a user has potentially been the victim of a data breach on a user-by-user basis. As an illustration, the breach communication circuit 118 may, for a given user, evaluate one or more indicators associated with the user to determine whether those indicators meet a certain threshold. For example, the breach communication circuit 118 may assign a numerical rating representative of the risk level to each of the one or more indicators associated with the given user and determine whether sum of the risk level(s) for the indicator(s) for a given entity that are associated with the user meet a certain total threshold. As another example, the breach communication circuit 118 may determine whether a given user is associated with a certain threshold number of indicators for a given entity. Additionally, in some arrangements, the breach communication circuit 118 may use multiple thresholds to determine a level of risk of breach for a given user, similar to the example described above.

As such, rather than broadcasting a large general message to all users of the provider, the breach communication circuit 118 only sends a notification regarding a potential or actual data breach to users who are enrolled in the breach notification service and are determined to be likely affected by the breach. Once the breach communication circuit 118 determines that a given user should be provided with a notification, the breach communication circuit 118 is configured to generate and provide a tailored communication regarding the data breach during a log-in process for the user. For example, the communication may be provided to the affected user as a splash page when the user logs in to a mobile banking application, an online banking portal, etc. As an illustration, the notification may state, "We noticed that you routinely shop at Merchant A. Merchant A just experienced a data breach. Would you like us to scan transactions associated with your card that you used at Merchant A to check for fraudulent activity?" As another example, the communication may be provided to the affected user as a pop-up notification displayed to the user when the user logs in to a mobile banking application, an online banking portal, etc. In various embodiments, the notification may be a splash page, a pop-up notification, a push notification (e.g., displayed via an application running on the user's phone), a text message, an email, etc. The notification may also provide a link to information about the breach provided by the effected entity (e.g., a press release from the affected entity).

In some arrangements, the notification may provide different color indicators (or other indicators, such as shape or size, animated versus static images, etc.) depending on the risk level that the user has experienced a data breach. As an illustration, the notification may be red if the user needs to take action immediately, with the notification directing the user to the actions to take now. In some implementations, the red notification may direct the user to a secure channel through which the user receives further instructions on how to work around and address the issue. For example, the user may receive a code, be directed to a security protocol login, and receive steps to take to remedy the issue once logged in (e.g., using the code). As another example, the user may receive a code and a number for an interactive voice response system that the user can call and provide the code to in order to receive steps to take to remedy the issue. The notification may be yellow if the user may be vulnerable to a current outside threat, with the notification suggesting one or more corrective actions to increase account security (e.g., decrease the likelihood that the user will be negatively affected, such as experience fraudulent transactions, as a result of the breach) and/or reduce a likeliness of a data breach between the affected entity and the user. Finally, the notification may be green if no current threats are detected or if a recent threat has been eliminated (e.g., the notification is shown as a report on a recent threat that occurred and has been fixed). Further, in some arrangements, the notification may be provided as a dashboard shown to all users enrolled in the breach notification service when those users log in, with the notification showing the indicator associated with the user's current account status.

Additionally, in various embodiments, the communication provided by the breach communication circuit 118 is configured to facilitate one or more corrective actions from within the communication. For example, a corrective action may be providing a real-time virtual card to the user's mobile wallet. As another example, a corrective action may be providing an alternate, secure method of transacting, such as setting up a mobile wallet for the user. As a third example, a corrective action may be requiring manual authorization by the user for transacting with entities that may have or are experiencing a breach or which may be fraudulent. As a fourth example, a corrective action may be requiring manual authorization for transactions over a certain amount from the user's affected account.

Moreover, the corrective action may be tailored to apply to the specific situation of the user. As an illustration, if the user has experienced a breach based on the user's use of a credit card, the breach communication circuit 118 may suggest a corrective action of setting up a mobile wallet for the user. As another illustration, if the user has experienced a breach in the past that was successfully remedied, the breach communication circuit 118 may recommend the same corrective actions used to remedy the user's past breach.

Additionally, in some embodiments, the breach communication circuit 118 may also send out one or more general notifications regarding the detected potential or actual breach. For example, the breach communication circuit 118 may send a user-specific notification to enrolled users who are determined to be likely affected by the data breach, as discussed above, and send a general notification to all other users informing them of the breach (e.g., linking to information about the breach released by the affected entity and informing the users to more closely watch transactions on their accounts).

The merchant computing system 104 is operated by a merchant. Examples of merchants include retailers, wholesalers, marketplace operators, service providers (e.g., loan service providers, cleaning service providers, transportation providers, etc.), and so on. Accordingly, the merchant computing system 104 is configured to conduct transactions with various users of the provider, and payments for the transactions may be facilitated by the provider computing system 102.

As shown in FIG. 1, the merchant computing system 104 includes a network interface 130 and a processing circuit 132. The network interface 130 includes program logic that facilitates coupling of the merchant computing system 104 to the network 108. Accordingly, the network interface 130 supports and enables communication between the merchant computing system 104 and other components of the system 100, such as the provider computing system 102.

The processing circuit 132 includes at least one processor 136 and a memory 138. As shown in FIG. 1, the memory 138 includes a user information database 140, though it should be understood that the user information database 140 may alternatively be provided separately from the memory 138. The user information database 140 is configured to retrievably store data about or relating to various users of the merchant and details of their transactions with the merchant. In some embodiments, the user information database 140 includes contact information for various users (e.g., names, billing addresses, shipping addresses, phone numbers, email addresses, etc.) and financial information (e.g., transaction histories, credit card numbers, tokenized payment information, etc.) for various users. As such, the merchant computing system 104 may be vulnerable to leaking user information in case of a data breach at the merchant computing system 104.

As shown in FIG. 1, the merchant computing system 104 and the provider computing system 102 may communicate via the network 108. Accordingly, in some embodiments, the breach detection circuit 116 may couple to the merchant computing system 104 via one or more APIs (e.g., which allow the breach detection circuit 116 to access information about the merchant computing system 104) to determine whether a data breach at the merchant computing system 104 has occurred. Additionally, in some embodiments, the breach detection circuit 116 may receive a communication from the merchant computing system 104 indicating that a data breach has occurred. Moreover, it should be understood that the provider computing system 102 may similarly couple to and/or communicate with a computing system operated by a different entity that stores consumer personal and/or financial information (e.g., a credit reporting agency).

The user device 106 is associated with a user holding one or more accounts with the provider. The user device 106 includes any computing device associated with the user and is configured to receive communications (e.g., via the network 108). For example, in various embodiments, the user device 106 may include a stationary device (e.g., a desktop computer) or a mobile device, such as a phone (e.g., a smartphone), a mobile computing device (e.g., a tablet computer, a laptop computer, a personal digital assistant, etc.), a wearable device (e.g., a smart watch, smart glasses, a smart bracelet, etc.), and so on.

As shown in FIG. 1, the user device 106 includes a network interface 150, an input/output circuit 152, a display 154, and a service access circuit 156. The network interface 150 includes program logic that facilitates coupling of the user device 106 to the network 108. Accordingly, the network interface 150 supports and enables communication between the user device 106 and other components of the system 100, as the provider computing system 102.

The input/output circuit 152 is structured to receive communications from and provide communications to the user associated with the user device 106. In this regard, the input/output circuit 152 is structured to exchange data, communications, instructions, etc. with an input/output component of the user device 106. Accordingly, in one embodiment, the input/output circuit 152 includes an input/output device. In another embodiment, the input/output circuit 152 includes communication circuitry for facilitating the exchange of data, values, messages, and the like between an input/output device and the components of the user device 106. In yet another embodiment, the input/output circuit 152 includes machine-readable media for facilitating the exchange of information between an input/output device and the components of the user device 106. In still another embodiment, the input/output circuit 152 includes any combination of hardware components, communication circuitry, and machine-readable media.

In various embodiments, the display 154 is a screen, a touchscreen, monitor, etc. In some arrangements, the user device 106 uses the display 154 to communicate information to the user, for example, by displaying information to the user on the display 154. In some arrangements, the user device 106 additionally uses the display 154 to receive communications from the user, for example, through a keyboard provided on a touchscreen of the display 154. Accordingly, in certain arrangements, the display 154 is incorporated as an input/output device associated with the input/output circuit 152.

The service access circuit 156 is configured to allow the user to enroll in the breach notification service provided by the provider. In some embodiments, the service access circuit 156 may be implemented as a specialized application (e.g., a mobile banking application, a mobile wallet application, etc.) or a generic application (e.g., a text messaging or SMS application) operating on the user device 106. As an example, the user may access the application (e.g., by logging into the application) and use the application to communicate a desire to enroll in the breach notification service. In other embodiments, the service access circuit 156 may be implemented as a web browser operating on the user device 106. For example, the user may log into an online banking portal and enroll, via the portal, in the breach notification service. The service access circuit 156 may also be implemented as a combination of application(s) and/or a web browser. Alternatively, in some embodiments, the user may not enroll in the breach notification service via the service access circuit 156. For example, the user may visit a branch location of the provider and enroll at the branch location.

Additionally, the service access circuit 156 is configured to display to the user a notification that a potential breach has occurred. Beneficially, to improve the efficacy of the message, the notification is provided during a log-in process. As used herein, the phrase or term "log-in process" refers to the process of accessing an electric product or service associated with the provider computing system 104, such as a mobile banking application or an online banking portal that is used to access a user's online banking information. Accordingly, when the notification is provided "during" a log-in process, the notification is provided after log-in credentials are entered (e.g., by the user typing in the log-in credentials, by the user providing their biometric information such as a finger print id, etc.) or retrieved (e.g., locally stored on the user device 106 or by the merchant computing system 104) and after the credentials are validated, but before reaching the main landing page that the user is logging into. As such, the notification interrupts the typical log-in process to reach the main landing page. For example, if the service access circuit 156 is implemented as a mobile banking application, the service access circuit 156 may display the notification as a pop-up notification or a push notification after the user has been authenticated (e.g., using a username and password). As another example, if the service access circuit 156 is implemented as a web browser, the service access circuit 156 may display the notification as a splash page after the user has been authenticated. As yet another example, if the service access circuit 156 is implemented as a text messaging application, the service access circuit 156 may receive a text message for the user in response to the user being authenticated during a log-in process (e.g., a log-in process implemented on a web browser).

Figure 2:
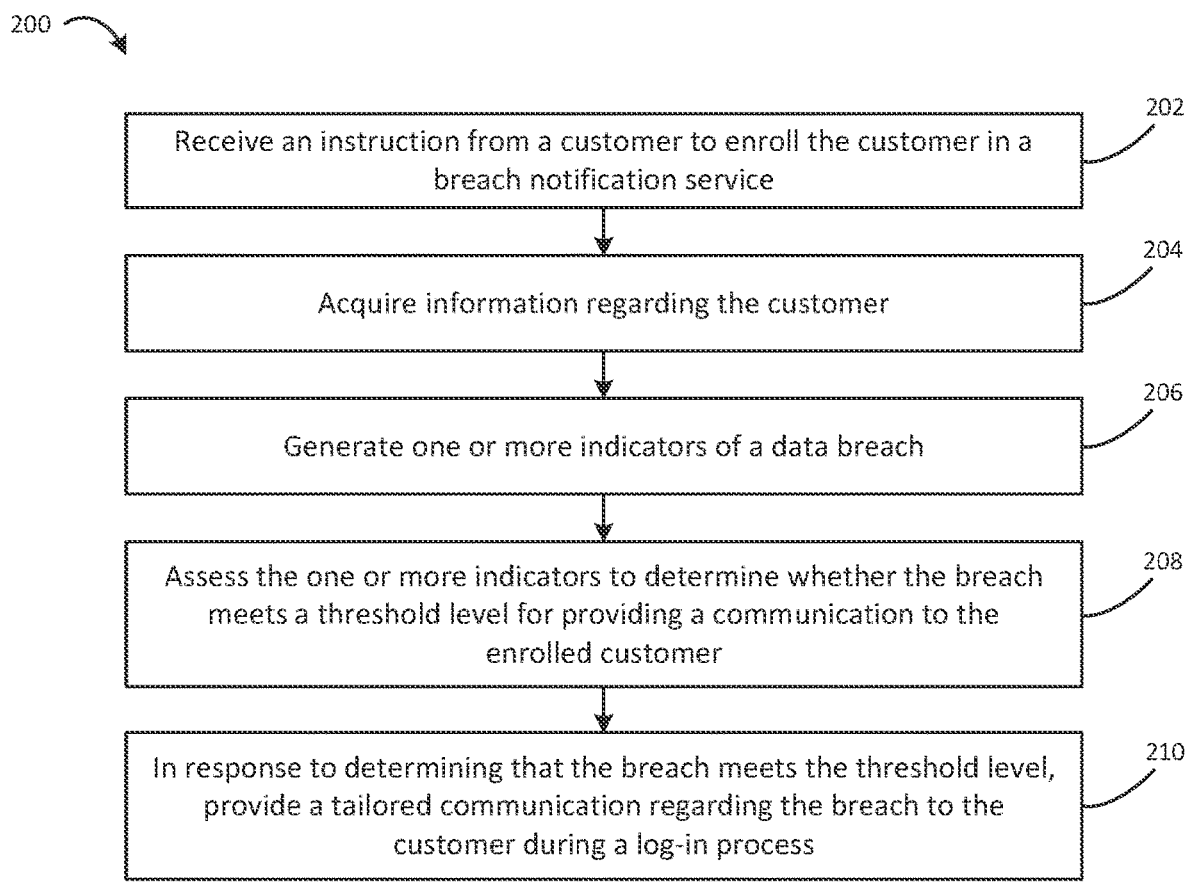
FIG. 2 is a flow diagram illustrating a process of providing a notification to a user regarding a data breach, according to an example embodiment.

Referring now to FIG. 2, a flow diagram of a method 200 of providing a notification to a user regarding a data breach is shown, according to an example embodiment. To begin with, at process 202, the enrollment circuit 114 receives an instruction from a user to enroll the user in a breach notification service. In one example, the enrollment circuit 114 receives the instruction via a mobile banking application operating on the user device 106. In another example, the enrollment circuit 114 receives the instruction via an online banking portal that the user has logged into. In yet another example, the enrollment circuit 114 receives the instruction via a branch of the provider.

At process 204, the enrollment circuit acquires information regarding the user. In some embodiments, the enrollment circuit 114 acquires information about the user that is already stored by the provider computing system 102 (e.g., in the user accounts database 124). In other embodiments, the enrollment circuit 114 is configured to gather additional information about the user such as, for example, by requesting additional information from the user at the time the user enrolls in the breach notification service or by gathering additional information about the user from a centralized database.

At process 206, the breach detection circuit 116 receives and/or generates one or more indicators of a data breach. For example, the breach detection circuit 116 may generate one or more indicators of a data breach occurring at the merchant computing system 104. In some embodiments, the breach detection circuit 116 is configured to receive information from the merchant computing system 104 (e.g., via an API) indicating a potential data breach and generate one or more indicators based on the received information. In other embodiments, the breach detection circuit 116 is configured to generate an indicator of a data breach by searching the Internet and screen scraping the results. In still other embodiments, the breach detection circuit 116 is configured to generate an indicator of a data breach by analyzing behaviors of users.

At process 208, the breach communication circuit 118 assesses the one or more indicators to determine whether the breach meets a threshold level for providing a communication to the user enrolled in the breach notification service. As discussed above with respect to FIG. 1, in some embodiments, the breach communication circuit 118 may determine whether a potential breach has occurred based on the one or more indicators and then determine which enrolled users may have been affected by the potential breach (e.g., based on the acquired information about the enrolled users). Alternatively, in other embodiments, the breach communication circuit 118 may determine whether a potential breach of a user's data has occurred on a user-by-user basis. Additionally, in some embodiments, the breach communication circuit 118 may use multiple thresholds in assessing whether a breach of the user's data has occurred.

In one embodiment, the breach communication circuit 118 determines whether users should be informed that an entity has or likely has suffered a data breach based on an indicator rating scale. As such, the breach communication circuit 118 may assign a rating out of 100 to each indicator associated with an entity based on how strongly the indicator supports the entity having suffered a data breach. For example, the breach communication circuit 118 may assign a rating of 100 to an indicator showing that the entity itself has reported experiencing a data breach, a rating of 60 to an indicator showing that a credit agency has reported that the entity has experienced a data breach, a rating of 40 to an indicator showing that a watchdog agency has reported that the entity has experienced a data breach, and a rating of 10 to an indicator showing that an individual (e.g., a user of the breach notification service) has reported suspicions that the entity has experienced a data breach. In various arrangements, the breach communication circuit 118 may receive the information for these indicators via APIs communicating with each of the entity, credit agency, and watchdog, which may be configured similar to the API receiving information from the merchant computing system 104, as described above with reference to FIG. 1.

The breach communication circuit 118 may then sum the ratings for all of the indicators associated with a given entity and notify users regarding the data breach in response to the sum meeting or exceeding a certain threshold, such as 70. Alternatively, the breach communication circuit 118 may provide a different notification to users based on different thresholds. As an illustration, the breach communication circuit 118 may provide a first notification to users, indicating a lower risk of data breach, in response to the sum meeting or exceeding a first threshold (e.g., 50) and provide a second notification to users, indicating a higher risk of data breach, in response to the sum meeting or exceeding a second threshold (e.g., 80).

Additionally, in another embodiment, the breach communication circuit 118 similarly determines whether a given user is affected or is likely affected by a data breach at a particular entity based on an indicator rating scale, where the breach communication circuit 118 assigns a rating out of 100 to each indicator associated with a user based on how strongly the indicator supports the user being affected by the data breach. As an example, the breach communication circuit 118 assigns a rating of 100 to an indicator showing that the user has experienced fraudulent activity on their account, a rating of 80 to an indicator showing that the user has conducted three or more transactions a month with the affected entity during the leaked data period, a rating of 70 to an indicator showing that the user has conducted three or more transactions a month with the affected entity during at least half of the leaked data period, a rating of 40 to an indicator showing that the user has conducted at least one credit card transaction with the affected entity during the leaked data period, a rating of 20 to an indicator showing that the user has conducted at least one mobile wallet transaction with the affected entity during the leaked data period, and a rating of 10 to an indicator showing that the user lives within five miles of the affected entity or a branch of the affected entity.

The breach communication circuit 118 may then sum the ratings for all of the indicators associated with a given user and notify the user regarding the data breach in response to the sum meeting or exceeding a certain threshold, such as 70. Alternatively, the breach communication circuit 118 may provide different types of notifications (e.g., recommending different types of corrective actions) based on the sum meeting different thresholds. For example, the breach communication circuit 118 may provide a first type of notification, indicating that the user should be aware that a potential breach of the user's data has occurred but that no corrective actions are currently needed, in response to the sum meeting a first threshold (e.g., 40). The breach communication circuit 118 may then provide a second type of notification, indicating that the user has likely experienced a data breach and recommending permissive corrective actions, in response to the sum meeting a second threshold (e.g., 60). Finally, the breach communication circuit 118 may provide a third type of notification, indicating that the user has very likely experienced a data breach and directing the user to corrective actions to take now, in response to the sum meeting a third threshold (e.g., 90).

In yet another embodiment, the breach communication circuit 118 may determine whether to provide a notification to a given user at least partially based on qualitative information from or about the user. For example, the breach communication circuit 118 may provide a notification to the user in response to the user self-reporting a suspected data breach of the user's data, with the notification confirming to the user that the provider computing system 104 is addressing the user's report.

At process 210, the breach communication circuit 118, in response to determining that the breach meets the threshold level, provides a tailored communication regarding the breach to the user during a log-in process. For example, the breach communication circuit 118 may provide the communication as a splash page, as a pop-up notification, as a push notification received via an application operating on the user's phone, as a text sent to the user's phone as the user is logging in, as an email sent to the user as the user is logging in, etc. In various embodiments, as described above, the communication may include different colors or other indicators depending on the risk level for the potential breach, be configured to facilitate corrective action from within the communication, be configured to facilitate user-specific corrective action from within the communication, and so on. In various implementations, the communication is received by the user at the user device 106 (e.g., as part of an application operating on the user device 106, as a splash page displayed on a web browser operating on the user device 106, as a text message or email received at the user device 106, etc.).

Figure 3:
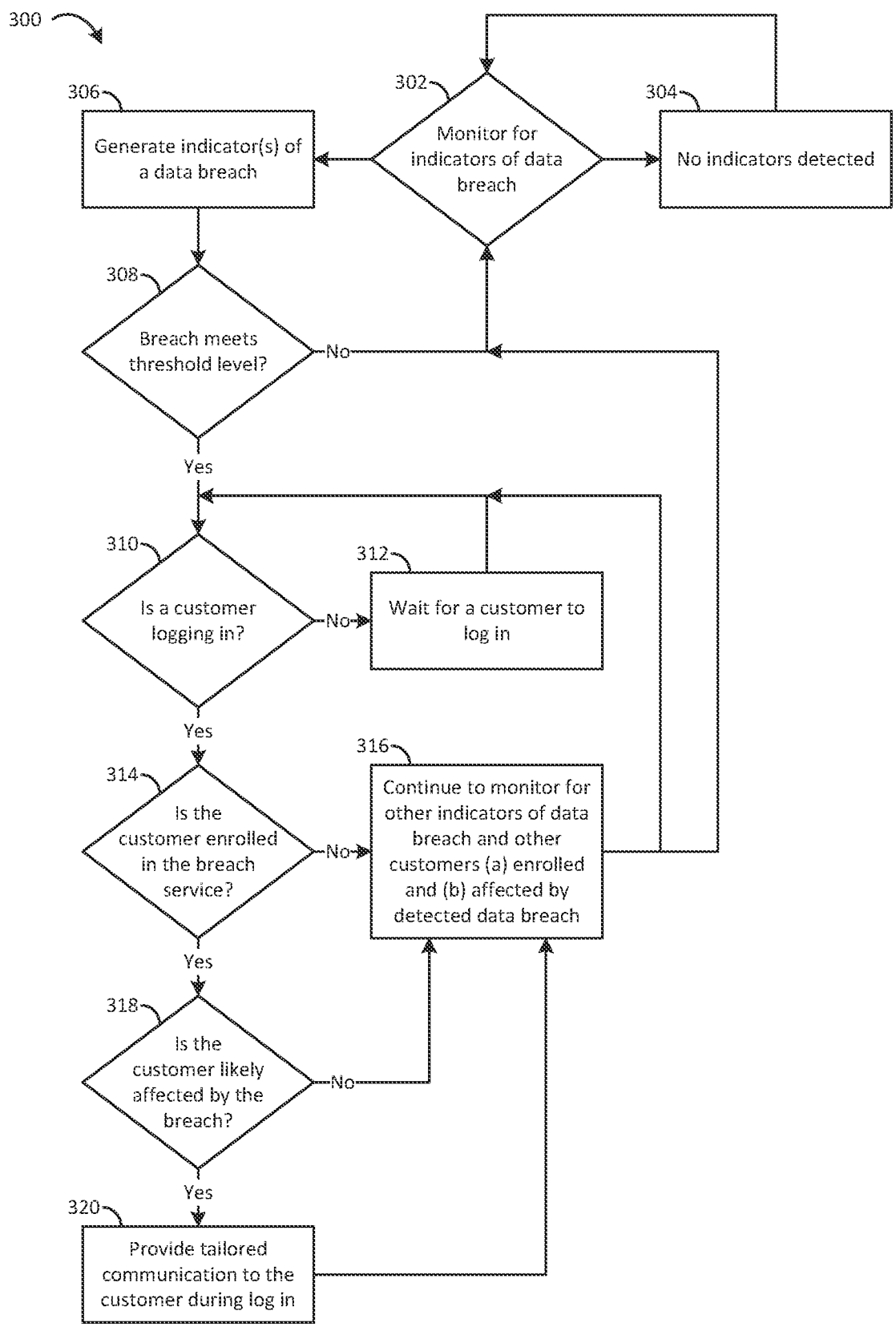
FIG. 3 is a flow diagram illustrating a process of providing a notification to a user regarding a data breach, according to another example embodiment.

Referring now to FIG. 3, a flow diagram of another method 300 of providing a notification to a user regarding a data breach is shown, according to an example embodiment. To begin with, at process 302, the provider computing system 102 monitors for indicators of data breach. For example, an indicator may be a press release by an affected merchant or other entity, a communication from a merchant or other entity, suspicious activity determined based on aggregate data from multiple consumer accounts, financial data showing that a given user has transacted with an entity known to have experienced a data breach, etc.

If no indicators are detected (process 304) the provider computing system 102 returns to process 302 and continues to monitor for indicators of data breach. If the provider computing system 102 generates one or more indicators of a data breach (process 306), the provider computing system 102 moves to process 308 and determines whether the potential data breach meets a threshold level for communicating the potential data breach to users. In one example, as described above, the provider computing system 102 determines whether a data breach may have occurred for a given merchant or other entity and then determines whether various users enrolled in the breach notification service have likely been affected by the breach. In another example, the provider computing system 102 determines, on a user-by-user basis, whether a given user enrolled in the breach notification service has likely been affected by a data breach.

If the provider computing system 102 determines that the potential data breach does not meet a threshold level at process 308, the provider computing system returns to process 302 and continues to monitor for indicators of data breach. If the potential data breach does meet the threshold level at process 308, the provider computing system 102 moves to process 310 and determines whether a user is currently logging in to access services offered by the provider computing system 102 (e.g., logging into an online banking portal, logging into a mobile banking application, etc.). If a user is not currently logging in, the provider computing system 102 moves to process 312 and waits for a user to log in, thus returning to process 310.

If a user is currently logging in, the provider computing system 102 moves to process 314 and determines whether the user is enrolled in the breach notification service. If the user logging in is not enrolled in the breach notification service, the provider computing system 102 moves to process 316 and continues to monitor for other indicators of data breach and other users (a) enrolled in the breach notification service and (b) determined to be likely affected by the detected data breach, thus returning to processes 302 and 310. In turn, continuing to monitor for other indicators of data breach and other users decreases the bandwidth necessary for method 300 because the provider computing system 102 is not providing notifications for all data breach situations and/or to all users. If, on the other hand, the user currently logging in is enrolled in the breach notification service, the provider computing system 102 determines whether the user is likely affected by the data breach at process 318. In one example, the provider computing system 102 determines whether the user has transacted (e.g., within a certain time period, for a certain number of times, etc.) with the entity experiencing the data breach. In another example, the provider computing system 102 retrieves a previous determination made by the provider computing system 102 indicating whether the user likely has experienced a data breach due to the affected entity.

If the provider computing system 102 determines at process 318 that the user has not likely been affected by the data breach, the provider computing system 102 moves to process 316 and continues to monitor for other indicators of data breach and other users (a) enrolled notification service and (b) determined to be likely affected by the detected data breach, thus returning to processes 302 and 310 as described above. By contrast, if the provider computing system 102 determines at process 318 that the user has likely been affected by the data breach, the provider computing system 102 moves to process 320 and provides a tailored communication to the user during the log-in process. For example, the communication is displayed as a splash page informing the user of the data breach and suggesting user-specific corrective actions that the user may take to address the data breach. The corrective actions may further be facilitated by the splash page itself. Once the communication has been provided to the user at process 320, the provider computing system 102 again moves to process 316, thus returning to processes 302 and 310 as described above.

Figure 4:
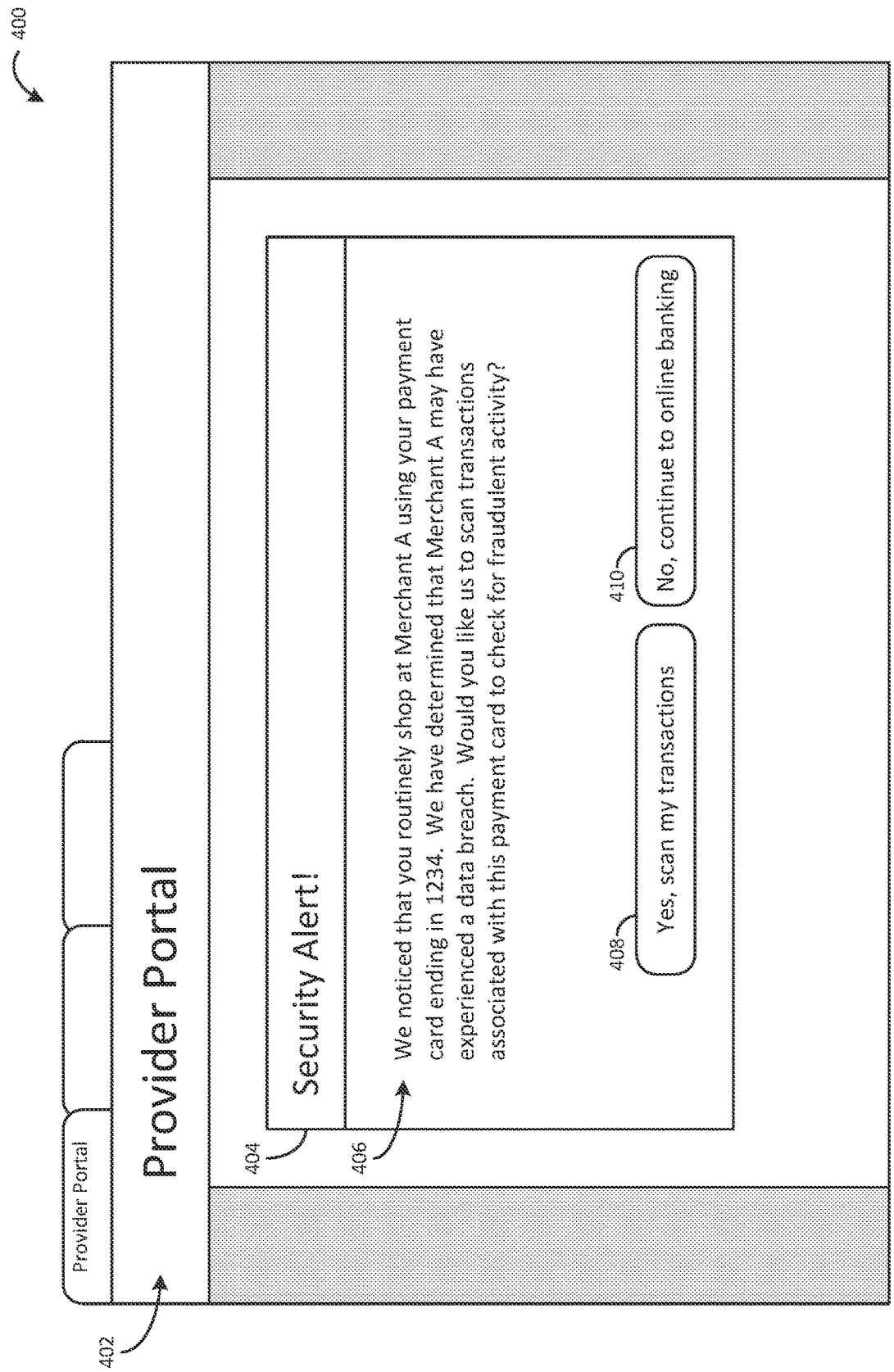
FIG. 4 is a graphical user interface shown to a user in response to detection of a potential breach, according to an example embodiment.
Figure 5:
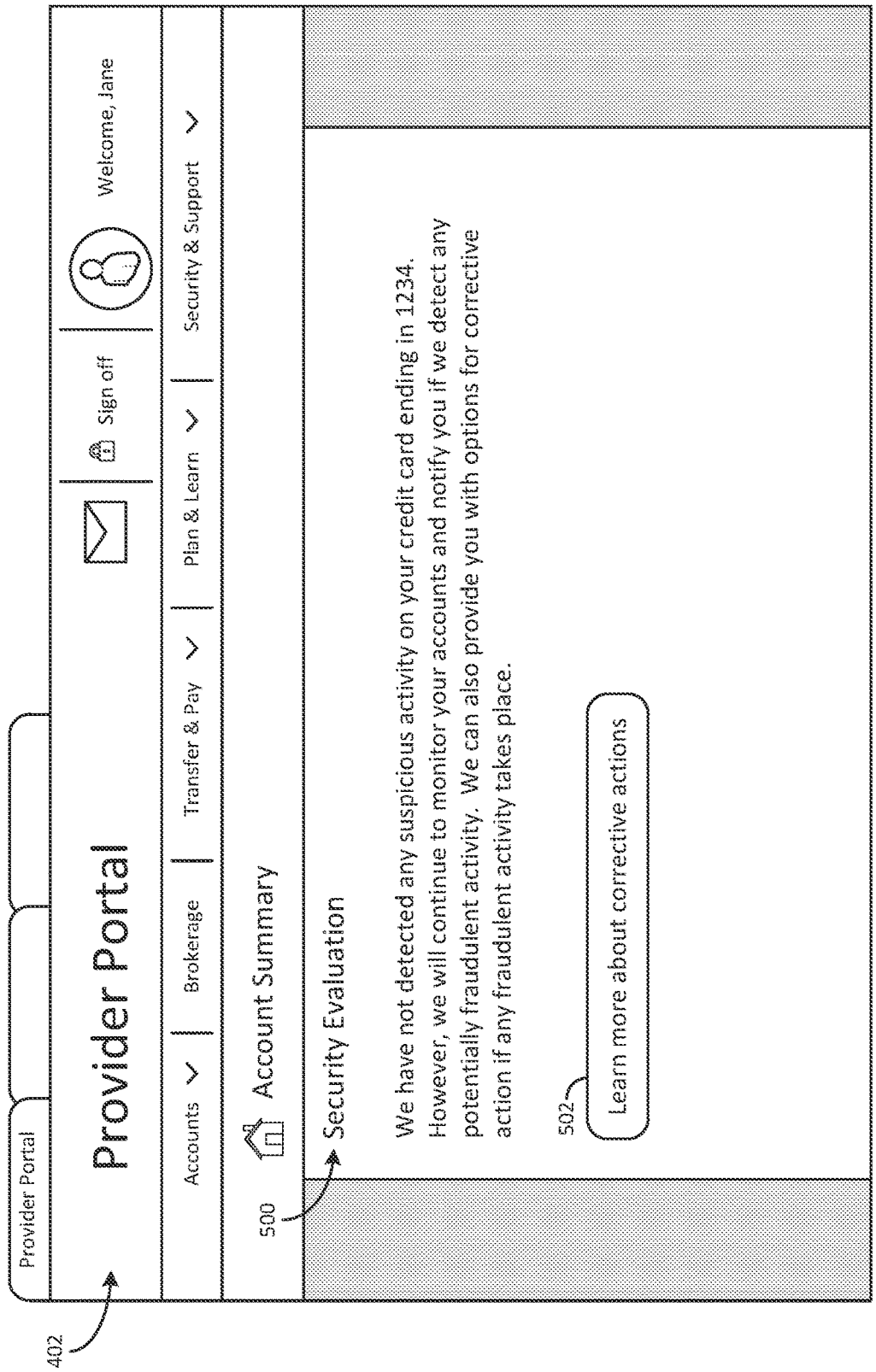
FIG. 5 is a graphical user interface shown to a user as part of a security evaluation performed in response to detection of a potential breach, according to an example embodiment.
Figure 6:
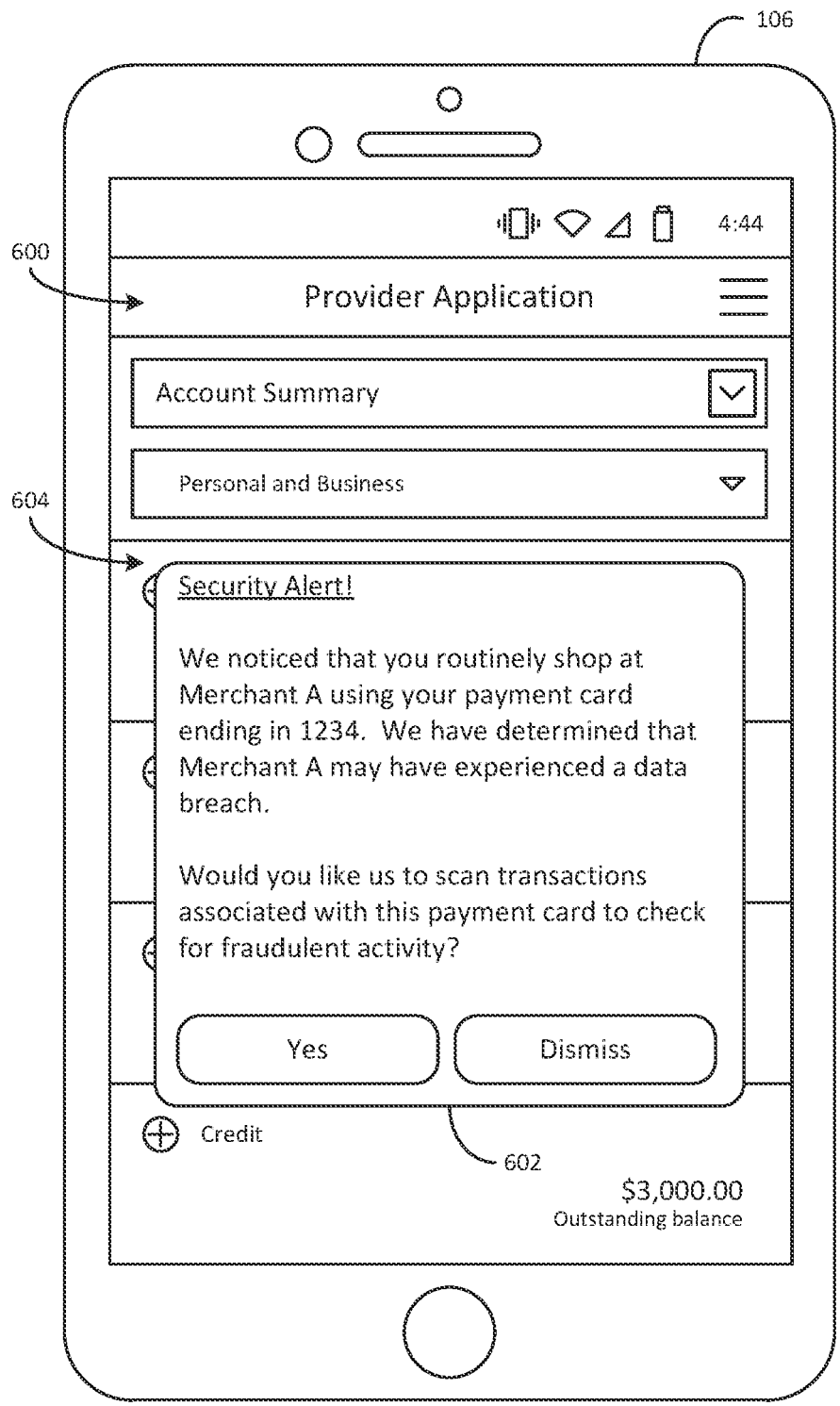
FIG. 6 is a graphical user interface shown to a user in response to detection of a potential breach, according to another example embodiment.

Referring now to FIGS. 4 and 5, graphical user interfaces shown to a user enrolled in the breach notification service are illustrated, according to example embodiments. In various arrangements, as illustrated in FIGS. 4 and 5, the graphical user interfaces are shown to the user on a web browser 400 (e.g., operating on the user device 106) during a log-in process to access an online banking portal 402 facilitating online services provided by the provider computing system 102. As an example, the log-in process may entail the user providing access credentials (e.g., a username and password, two-factor authentication including a username and password as well as a code that is texted to the user, etc.).

Referring first to FIG. 4, a splash page 404 is shown to the user after the user has provided the access credentials to the provider computing system 102. The splash page 404 includes a notification 406 informing the user that the user routinely shops at Merchant A using the user's payment card ending in 1234 and that Merchant A may have experienced a data breach. The notification 406 further provides a recommended corrective action to the user. Specifically, in the embodiment of FIG. 4, the notification 406 asks the user if the user would like the provider computing system 102 to scan the transactions associated with this payment card to check for fraudulent activity. The notification 406 then provides the user with the option to select a first button 408, indicating that the user would like the provider computing system 102 to take the corrective action (e.g., scan the user's transactions) or a second button 410, indicating that the user would not like to take the corrective action at this time (e.g., continue to online banking).

In various arrangements, if the user selects the first button 408, the user is redirected to a page shown as part of the online banking portal 402. For example, the user may be redirected to a security evaluation page 500, as shown in FIG. 5. In the example shown in FIG. 5, the security evaluation page 500 indicates that the provider computing system 102 has not detected any suspicious activity on the user's credit card ending in 1234 but that provider computing system 102 will continue to monitor the user's accounts and notify the user if the provider computing system 102 detects any potentially fraudulent activity. The security evaluation page 500 also indicates that the user may be provided with options for corrective action should any fraudulent activity take place and includes a button 502 that the user can press to learn about corrective actions. It should be understood, however, that the security evaluation page 500 is an example of an outcome of the provider computing system 102 scanning the user's transactions and that other outcomes may also be possible. For example, if the provider computing system 102 detects suspicious activity on the user's account (e.g., suspected fraudulent activity), the security evaluation page 500 may present the activity to the user for further evaluation and/or corrective actions, if needed.

Moreover, it should be understood that FIGS. 4 and 5 are intended to be exemplary and that other user interfaces may be presented to a user as part of notifying the user that he or she may have been affected by a data breach. As an example, if the provider computing system 102 determines that the user has likely been affected by a data breach, the provider computing system 102 may automatically scan the user's transactions to determine whether the user's account or accounts have experienced any fraudulent activity. A splash page (or other type of notification) shown to the user during the log-in process may then indicate that the user has likely been affected by the breach and also indicate whether the provider computing system 102 has detected any suspected fraudulent activity on the user's account(s).

Referring now to FIGS. 6-10, graphical user interfaces shown to a user enrolled in the breach notification service are illustrated, according to example embodiments. In various arrangements, as illustrated in FIGS. 6-10, the graphical user interfaces are shown to the user as part of an application 600 associated with the provider and operating on the user device 106. In particular, referring to FIG. 6, the user is shown a pop-up notification 602 over a home screen 604 when the user logs in to access the application 600 (e.g., by providing a username and password to the application, by providing two-factor authentication including a username or password as well as a code that is texted to the user, etc.).

The pop-up notification 602 indicates to the user that the user routinely shops at Merchant A using the user's payment card ending in 1234 and that the provider computing system 102 has determined that Merchant A may have experienced a data breach. The pop-up notification 602 also includes a suggested corrective action. Specifically, in the embodiment of FIG. 6, the notification 602 asks the user if the user would like the provider computing system 102 scan transactions associated with the payment card ending in 1234 to check for fraudulent activity. Further, the pop-up notification 602 includes a "Yes" button that the user can select to indicate that the user would like the provider computing system 102 to take the corrective action (e.g., scan for fraudulent transactions) and a "Dismiss" button that the user can select to instead dismiss the pop-up notification 602 (e.g., continuing to the home screen 604).

Figure 7:
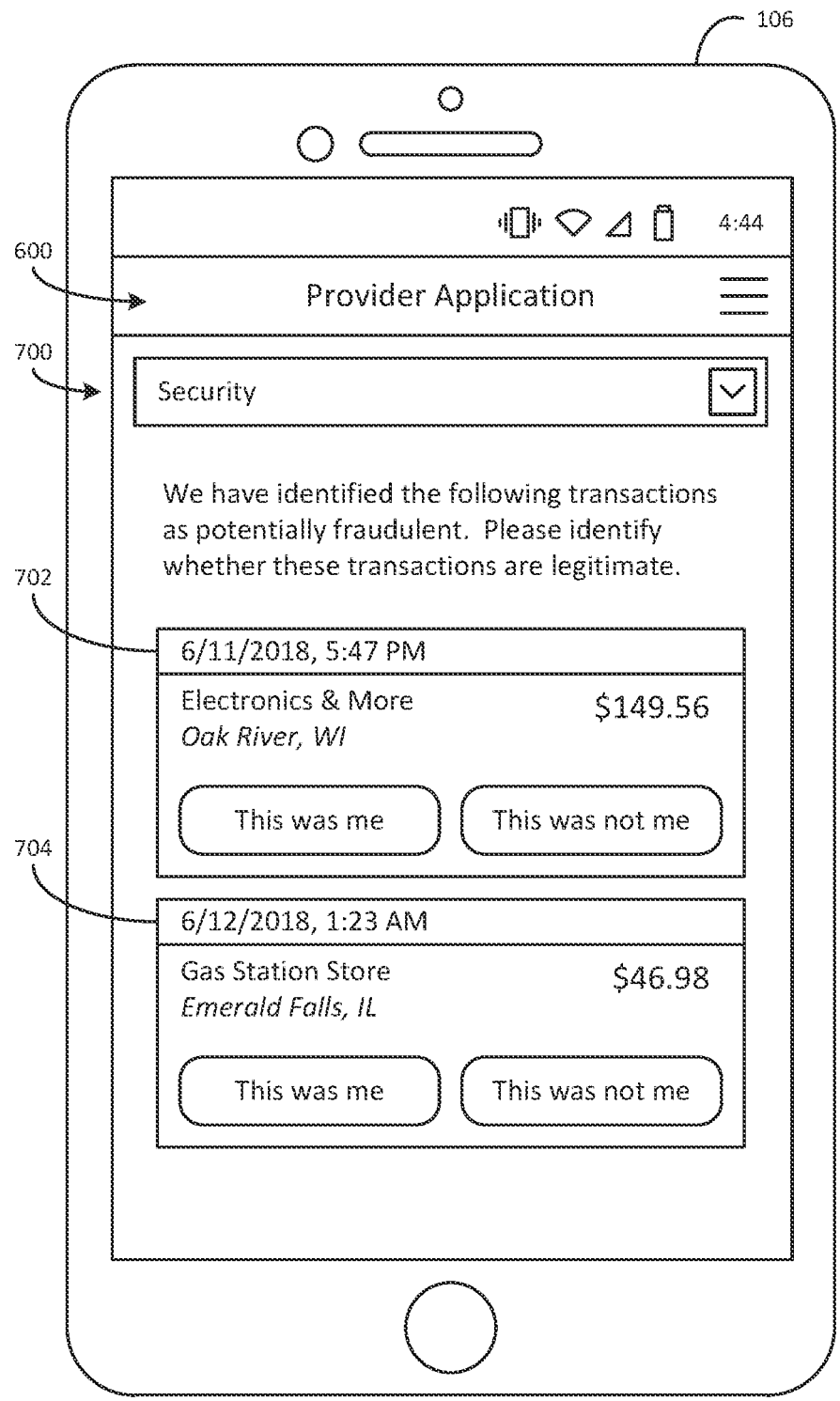
FIG. 7 is a graphical user interface shown to a user as part of a security evaluation performed in response to detection of a potential breach, according to another example embodiment.

If the user selects the "Yes" button, the user is redirected, for example, to a security page 700 shown in FIG. 7. The security page 700 informs the user that the provider computing system 102 has identified certain transactions as potentially fraudulent and asks the user to identify whether these identified transactions are legitimate. In the example of FIG. 7, the potentially fraudulent transactions include a first transaction 702 at an electronics store and a second transaction 704 at a gas station store. Each of these identified transactions 702 and 704 includes a "This was me" button that the user can select to indicate that the transaction is legitimate and a "This was not me" button that the user can select to indicate that the transaction is fraudulent.

Figure 8:
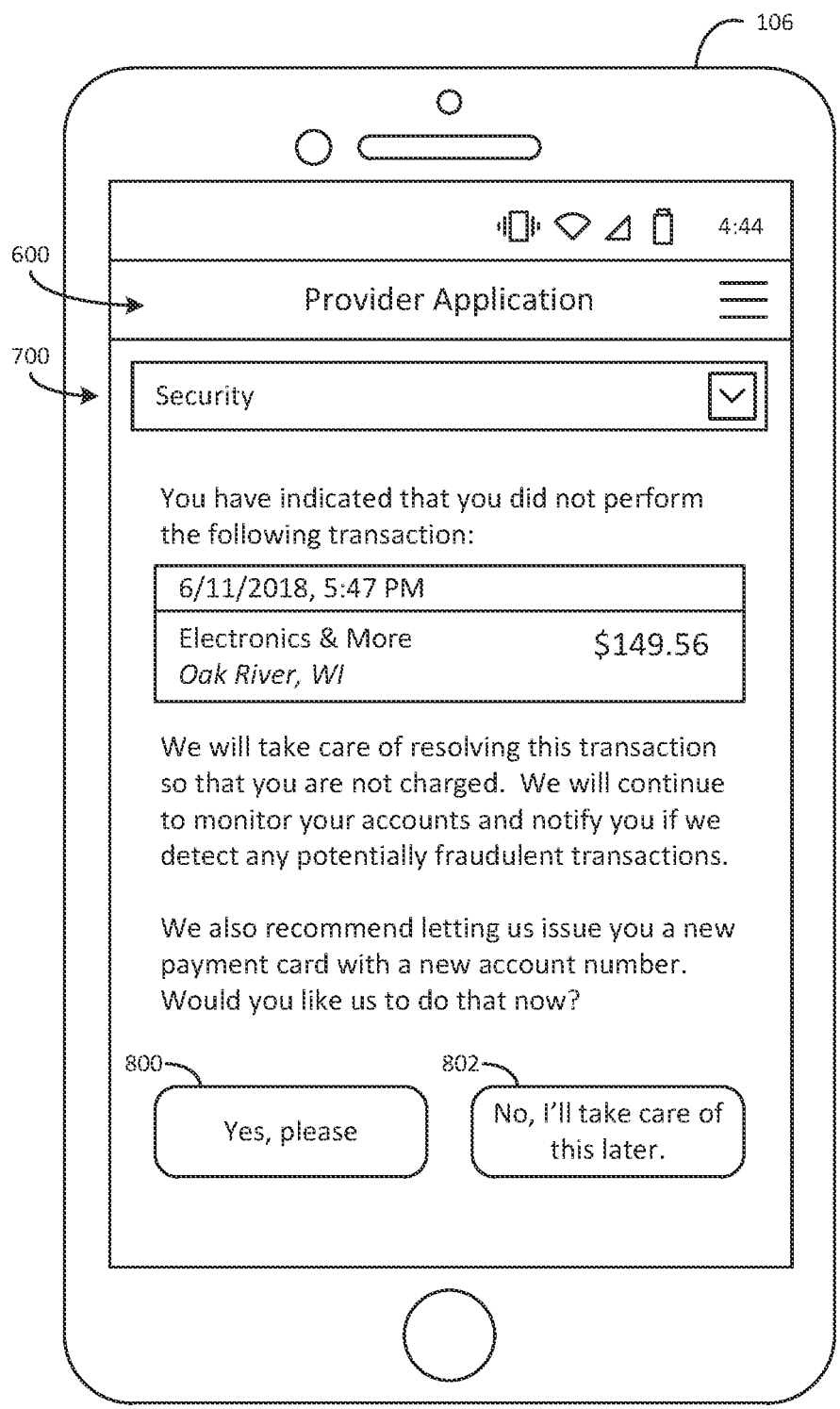
FIG. 8 is a graphical user interface shown to a user as part of a security evaluation performed in response to detection of a potential breach, according to another example embodiment.

Once the user has selected a button for each of the first and second transactions 702 and 704, the security page 700 confirms that selected fraudulent transaction(s), as shown in FIG. 8. In the example of FIG. 8, the user indicated that the first transaction 702 was fraudulent but that the second transaction 704 was legitimate. Accordingly, the security page 700 as shown in FIG. 8 indicates that the provider computing system 102 will resolve the first transaction 702 so that the user is not charged. The security page 700 also indicates that the provider computing system 102 will continue to monitor the user's accounts and notify the user if the provider computing system 102 detects any potentially fraudulent transactions to the user. Additionally, the security page 700 includes a user-specific recommended corrective action. In the example of FIG. 8, the security page 700 recommends that the user allows the provider computing system 102 to issue the user a new payment card with a new account number based on the fact that the user indicated a fraudulent transaction took place. The security page 700 also includes a first button 800 that the user can select, indicating that the user would like the provider computing system 102 to take the user-specific corrective action (e.g., issue the user a new credit card), and a second button 802 that the user can select, indicating that the user would not to take the user-specific corrective action.

Figure 9:
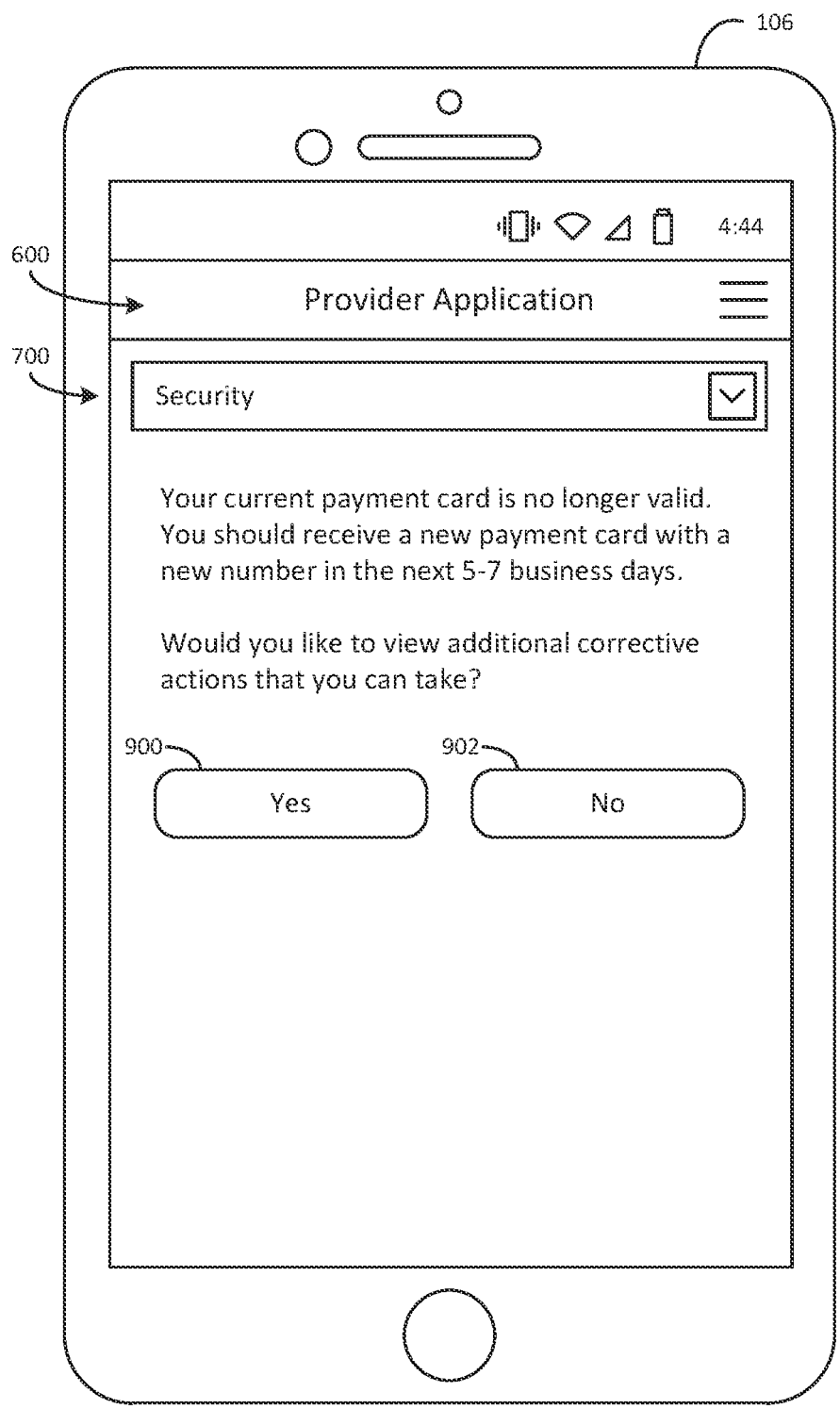
FIG. 9 is a graphical user interface shown to a user as part of a security evaluation performed in response to detection of a potential breach, according to another example embodiment.

In response to the user selecting the first button 800, for example, the security page 700 confirms that the user's current payment card is no longer valid and that the user should receive a new payment card with a new number in the next 5-7 business days, as shown in FIG. 9. Furthermore, the security page 700 asks the user if the user would like to view additional corrective actions that the user can take. The security page 700 thus includes a first button 900 that the user can press to view the additional corrective actions and a second button 902 that the user can select to, for example, return to the home screen 604 of the application.

Figure 10:
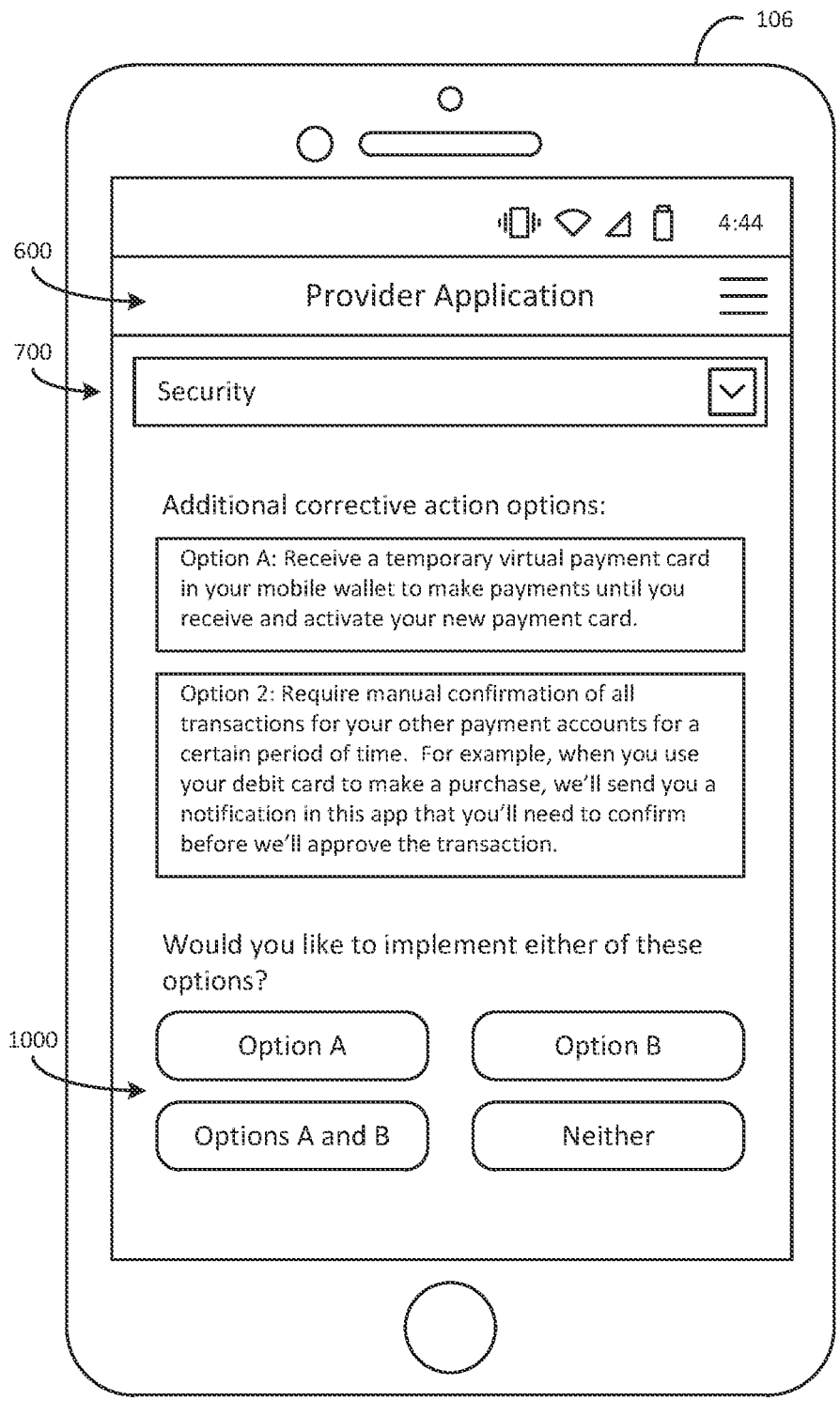
FIG. 10 is a graphical user interface shown to a user as part of a security evaluation performed in response to detection of a potential breach, according to another example embodiment.

In response to the user selecting the first button 900, for example, the security page 700 displays additional user-specific corrective actions that can be taken, as shown in FIG. 10. In the example of FIG. 10, the additional corrective action options include option A, which is receiving a temporary virtual payment card in the user's mobile wallet with which the user can make payments until the user receives and activates the new payment card. The additional corrective active options also include option B, which is requiring manual confirmation of all transactions for the user's payment accounts for a certain period of time. For example, option B may include, in response to a transaction being initiated using one of the user's payment accounts, the provider computing system 102 sending the user a notification in the application 600 that the user will need to confirm before the provider computing system 102 approves the transaction. The user is also presented with buttons 1000, whereby the user can select whether the user would like to implement option A, option B, options A and B, or neither option.

It should be understood, however, that the security page 700 shown in FIGS. 7-10 is an example of an outcome of the provider computing system 102 scanning the user's transactions and that other outcomes may also be possible. For example, if the provider computing system 102 does not detect any suspicious activity on the user's account, the security page 700 may instead indicate that no fraudulent activity has been detected but that the user should monitor the user's accounts and report any fraudulent activity to the provider computing system 102, similar to the security evaluation page 500 shown in FIG. 5. Moreover, it should be understood that different recommended corrective actions may be issued based on the user's specific situation. As an example, if the provider computing system 102 determines that none of the user's transactions appear fraudulent but that the user is still at a high risk of data breach, the provider computing system 102 may recommend that the user use the user's mobile wallet as a more secure transaction method. Further, if the user does not have a mobile wallet, the security page 700 may walk the user through a process of setting up a mobile wallet for the user.

Moreover, it should be understood that FIGS. 6-10 are intended to be exemplary and that other user interfaces may be presented to a user as part of notifying the user that he or she may have been affected by a data breach. As an example, if the provider computing system 102 determines that the user has likely been affected by a data breach, the provider computing system 102 may automatically scan the user's transactions to determine whether the user's account or accounts have experienced any fraudulent activity. The pop-up notification (or other type of notification) shown to the user during the log-in process may then indicate that the user has likely been affected by the breach and also indicate whether the provider computing system 102 has detected any suspected fraudulent activity on the user's account(s). Further, if user confirms that one or more of the transactions is fraudulent, the provider computing system 102 may automatically take one or more corrective actions, such as cancelling the user's credit card, and walk the user through additional recommended corrective actions.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature. Thus, circuit A may be coupled to circuit B even when communications between circuits A and B are routed through an intermediary.

As used herein, the term "circuit" may include machine or computer-readable media that are executable by one or more processors (e.g., multiple remote processors coupled to each other through any type of network). The machine-readable media may include code, which may be written in any programming language, including, but not limited to, Java or the like and any conventional procedural programming languages, such as the "C" programming language or similar programming languages. Alternatively, the term "circuit" may include hardware structured to execute the functions described herein, and in some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, or XNOR), resistors, multiplexers, registers, capacitors, inductors, diodes, wiring, and so on. Thus, a circuit may also include programmable hardware devices such as field programmable gate arrays, programmable array logic programmable logic devices, or the like.

In other embodiments, the "circuit" includes one or more processors communicably coupled to one or more memories or memory devices. In this regard, the one or more processors execute instructions stored in the memory or execute instructions otherwise accessible to the one or more processors. In various arrangements, the one or more processors are embodied in various ways and are constructed in a manner sufficient to perform at least the operations described herein. In some embodiments, the one or more processors are shared by multiple circuits (e.g., circuit A and circuit B comprise or otherwise share the same processor which, in some example embodiments, executes instructions stored, or otherwise accessed, via different areas of memory). Additionally, in various arrangements, a given circuit or components thereof (e.g., the one or more processors) are disposed locally (e.g., as part of a local server or a local computing system) or remotely (e.g., as part of a remote server such as a cloud-based server). To that end, in certain arrangements, a "circuit" as described herein includes components that are distributed across one or more locations.

As used herein, a processor is implemented as a general-purpose processor, an application specific integrated circuit (ASIC), one or more field programmable gate arrays (FPGAs), a digital signal processor (DSP), a group of processing components, or other suitable electronic processing components. Additionally, in some arrangements, a "processor," as used herein, is implemented as one or more processors. In certain embodiments, the one or more processors are structured to perform or otherwise execute certain operations independent of one or more co-processors. In other example embodiments, two or more processors are coupled via a bus to enable independent, parallel, pipelined, or multi-threaded instruction execution. In some arrangements, the one or more processors take the form of a single core processor, multi-core processor (e.g., a dual core processor, triple core processor, or quad core processor), microprocessor, and the like. In some embodiments, the one or more processors are external to the apparatus, for example, the one or more processors are a remote processor (e.g., a cloud-based processor). Alternatively, or additionally, the one or more processors are internal and/or local to the apparatus. Accordingly, an exemplary system for implementing the overall system or portions of the embodiments might include a general-purpose computing computers in the form of computers, including a processing unit, a system memory, and a system bus that couples various system components including the system memory to the processing unit.

Additionally, as used herein, a memory includes one or more memory devices including non-transient volatile storage media, non-volatile storage media, non-transitory storage media (e.g., one or more volatile and/or non-volatile memories), and the like. In some embodiments, the non-volatile media takes the form of ROM, flash memory (e.g., flash memory such as NAND, 3D NAND, NOR, or 3D NOR), EEPROM, MRAM, magnetic storage, hard discs, optical discs, and the like. In some embodiments, the volatile storage media takes the form of RAM, TRAM, ZRAM, and the like. Combinations of the above are also included within the scope of machine-readable media. In this regard, machine-executable instructions comprise, for example, instructions and data which cause a general purpose computer, special purpose computer, or special purpose processing machines to perform a certain function or group of functions. In various arrangements, each respective memory device is operable to maintain or otherwise store information relating to the operations performed by one or more associated circuits, including processor instructions and related data (e.g., database components, object code components, or script components), in accordance with the example embodiments described herein.

It should be understood that a "network interface," as used herein, is structured to communicate data over a network (e.g., the network 108) includes any of a cellular transceiver (Code Division Multiple Access (CDMA), Global System for Mobile Communications (GSM), Long-Term Evolution (LTE), etc.), a wireless network transceiver (e.g., 802.11X, ZigBee, or Bluetooth), or a combination thereof (e.g., both a cellular transceiver and a Bluetooth transceiver). In some arrangements, a network interface includes hardware and machine-readable media sufficient to support communication over multiple channels of data communication. Further, in some arrangements, the network interface includes cryptography capabilities to establish a secure or relatively secure communication session between the device including the network interface and other devices of the system 100 via the network 108. In this regard, personal information about clients, financial data, and other types of data is encrypted and transmitted to prevent or substantially prevent the threat of hacking.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques, with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   acquiring, by a provider computing system, information regarding a user enrolled in a breach notification service including information regarding a mobile wallet application of a user device of the user;
   generating, by the provider computing system, one or more indicators of a data breach for an entity that stores one of transactional behavior data regarding the user or an indication of a transaction with the user in a past predefined time period;

determining, by the provider computing system, that the one or more indicators meet a threshold level for notifying the user of the data breach;

in response to determining that the one or more indicators meet the threshold level, generating, by the provider computing system, a first notification specific to the user regarding the data breach and including an option to scan transaction information of the user for suspected fraudulent activity at the entity;

providing, by the provider computing system, the first notification to the user during a log-in process associated with the provider computing system, the first notification being provided subsequent to an authorization of the user during the log-in process;

receiving, by the provider computing system, an indication from the user to exercise the option to scan the transaction information of the user for suspected fraudulent activity at the entity;

scanning, by the provider computing system, the transaction information;

determining, by the provider computing system, a suspected fraudulent transaction based on scanning the transaction information;

generating, by the provider computing system and in response to determining the suspected fraudulent transaction, a second notification specific to the user and the suspected fraudulent transaction, the second notification comprising a location and date of the suspected fraudulent transaction and a selectable option to indicate that the suspected fraudulent transaction is fraudulent;

providing, by the provider computing system, the second notification to the user during the log-in process associated with the provider computing system; and in response to receiving an indication of a selection of the selectable option, i) deactivating, by the provider computing system, a payment card associated with the fraudulent transaction; ii) providing, by the provider computing system, a supplemental notification to the user regarding the fraudulent transaction; and iii) providing, by the provider computing system, a temporary virtual card to the mobile wallet application of the user device.

2. The method of claim 1, further comprising:
assigning, by the provider computing system, a risk level to each of the one or more indicators;
comparing, by the provider computing system, a value regarding the risk level of each of the one or more indicators to the threshold level; and
determining, by the provider computing system, that the value regarding the risk level of each of the one or more indicators meets or exceeds the threshold level.

3. The method of claim 1, wherein the log-in process comprises:
receiving, by the provider computing system, at least one log-in credential corresponding to the user; and
providing, by the provider computing system, access to a secured area of an online banking portal or a mobile banking application based on the at least one log-in credential;
wherein the first notification is provided after receiving the at least one log-in credential and before providing access to the secured area.

4. The method of claim 1, wherein at least one of the first notification or the second notification is one of a splash page or a pop-up notification.

5. The method of claim 1, wherein the second notification comprises a second selectable option, wherein the method further comprises in response to receiving an indication of a selection of the second selectable option, causing, by the provider computing system, an implementation of a manual confirmation of transactions by the user for a certain period of time.

6. The method of claim 1, further comprising:
issuing, by the provider computing system, a new payment card with a new account number.

7. The method of claim 1, wherein at least one of the one or more indicators comprises one or more of a press release by the entity, a received communication from the entity, suspicious activity determined based on aggregate data from multiple accounts associated with the entity, or financial data associated with the entity.

8. A system, comprising:
a network interface structured to communicate data over a network;
at least one processor; and
at least one memory coupled to the at least one processor, the at least one memory comprising non-transitory machine-readable storage media having instructions stored thereon that, when executed by the at least one processor, cause the system to:
acquire information regarding a user enrolled in a breach notification service;
generate one or more indicators of a data breach for an entity that stores one of transactional behavior data regarding the user or an indication of a transaction with the user in a past predefined time period;
determine that the one or more indicators meet a threshold level for notifying the user of the data breach;
in response to determining that the one or more indicators meet the threshold level, generate a first notification specific to the user regarding the data breach and including an option to scan transaction information of the user for suspected fraudulent activity at the entity;
provide, via the network interface, the first notification to the user during a log-in process associated with a provider computing system, the first notification being provided subsequent to an authorization of the user during the log-in process;
receive an indication from the user to exercise the option to scan the transaction information of the user for suspected fraudulent activity at the entity;
scan the transaction information;
determine a suspected fraudulent transaction based on scanning the transaction information;
generate, in response to determining the suspected fraudulent transaction, a second notification specific to the user and the suspected fraudulent transaction, the second notification comprising a location and date of the suspected fraudulent transaction and a selectable option to indicate that the suspected fraudulent transaction is fraudulent;
provide, via the network interface, the second notification to the user during the log-in process associated with the provider computing system; and
in response to receiving an indication of a selection of the selectable option, i) deactivate a payment card associated with the fraudulent transaction; ii) provide a supplemental notification to the user regarding the fraudulent transaction; and iii) provide a temporary virtual card to a mobile wallet application of a user device.

9. The system of claim 8, wherein the instructions further cause the system to:
assign a risk level to each of the one or more indicators;
compare a value regarding the risk level of the one or more indicators to the threshold level; and
determine that the value of the risk level meets or exceeds the threshold level.

10. The system of claim 8, wherein the log-in process comprises:
receiving, via the network interface, at least one log-in credential corresponding to the user; and
providing, via the network interface, access to a secured area of an online banking portal or a mobile banking application based on the received at least one log-in credential;
wherein the first notification is provided after receiving the at least one log-in credential and before providing access to the secured area.

11. The system of claim 8, wherein at least one of the first notification or the second notification is one of a splash page or a pop-up notification.

12. The system of claim 8, wherein the second notification comprises a second selectable option and the instructions further cause the system to cause, in response to receiving an indication of a selection of the second selectable option, an implementation of a manual confirmation of transactions by the user for a certain period of time.

13. The system of claim 8, wherein the instructions further cause the system to issue a new payment card with a new account number.

14. The system of claim 8, wherein at least one of the one or more indicators comprises one or more of a press release by the entity, a received communication from the entity, suspicious activity determined based on aggregate data from multiple accounts associated with the entity, or financial data associated with the entity.

15. A computer-implemented method, comprising:
receiving, by a provider computing system, information regarding a user;
determining, by the provider computing system, that one or more indicators meet a threshold level for notifying the user of a data breach based on the received information, the one or more indicators generated for an entity that stores one of transactional behavior data regarding the user or an indication of a transaction with the user in a past predefined time period;
in response to determining that the one or more indicators meet the threshold level, generating, by the provider computing system, a first notification specific to the user regarding the data breach, wherein the first notification includes instructions for taking one or more user-specific corrective actions to address the data breach and an option to scan transaction information of the user for suspected fraudulent activity, and wherein the first notification facilitates the one or more user-specific corrective actions from the first notification;
providing, by the provider computing system, the first notification to the user during a log-in process associated with the provider computing system, the first notification being provided subsequent to an authorization of the user during the log-in process;
receiving, by the provider computing system, an indication from the user to exercise the option to scan the transaction information of the user for suspected fraudulent activity;
scanning, by the provider computing system, the transaction information;
determining, by the provider computing system, a suspected fraudulent transaction based on scanning the transaction information;
generating, by the provider computing system and in response to determining the suspected fraudulent transaction, a second notification specific to the user and the suspected fraudulent transaction, the second notification comprising a location and date of the suspected fraudulent transaction and a selectable option to indicate that the suspected fraudulent transaction is fraudulent; and
in response to receiving an indication of a selection of the selectable option, i) deactivating, by the provider computing system, a payment card associated with the fraudulent transaction; ii) provide a supplemental notification to the user regarding the fraudulent transaction; and iii) provide a temporary virtual card to a mobile wallet application of a user device.

16. The method of claim 15, further comprising:
assigning, by the provider computing system, a risk level to each of the one or more indicators;
comparing, by the provider computing system, a value regarding the risk level of each of the one or more indicators to the threshold level; and
determining, by the provider computing system, that the value regarding the risk level of each of the one or more indicators meets or exceeds the threshold level.

17. The method of claim 15, wherein the log-in process comprises:
receiving, by the provider computing system, at least one log-in credential corresponding to the user; and
providing, by the provider computing system, access to a secured area of an online banking portal or a mobile banking application based on the at least one log-in credential;
wherein the first notification is provided after receiving the at least one log-in credential and before providing access to the secured area.

18. The method of claim 15, wherein at least one of the first notification or the second notification is one of a splash page or a pop-up notification.

19. The method of claim 15, wherein the second notification comprises a second selectable option, wherein the method further comprises in response to receiving an indication of a selection of the second selectable option, causing, by the provider computing system, an implementation of a manual confirmation of transactions by the user for a certain period of time.

20. The method of claim 15, further comprising issuing, by the provider computing system, a new payment card with a new account number.

* * * * *